July 20, 1926.
F. K. HENDRICKSON
SHAFT BEARING
Filed Feb. 24, 1926
1,593,073
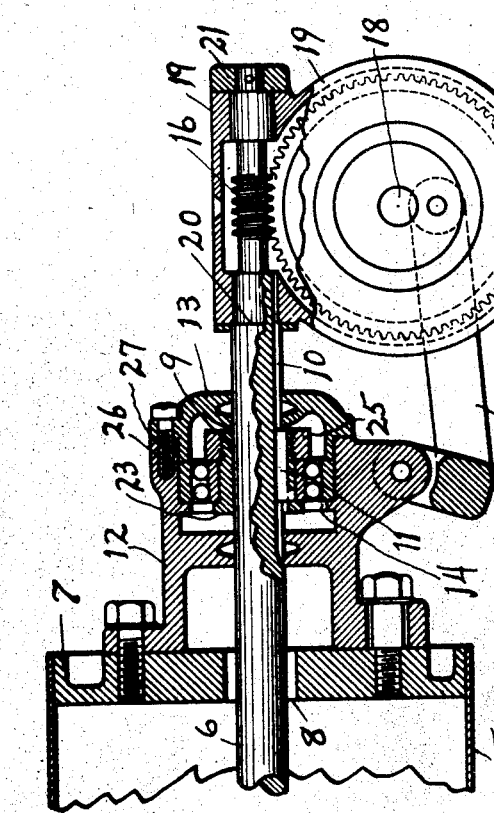
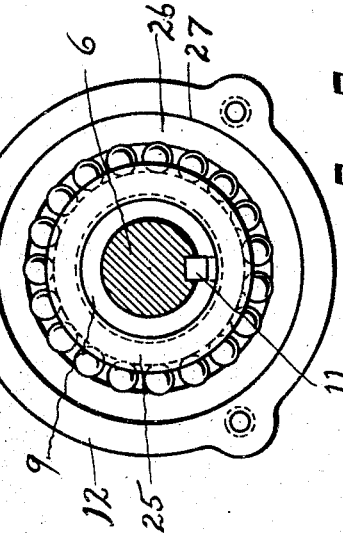
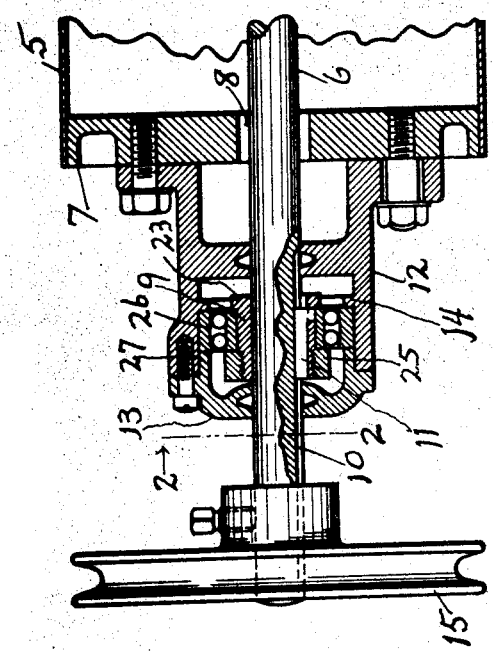
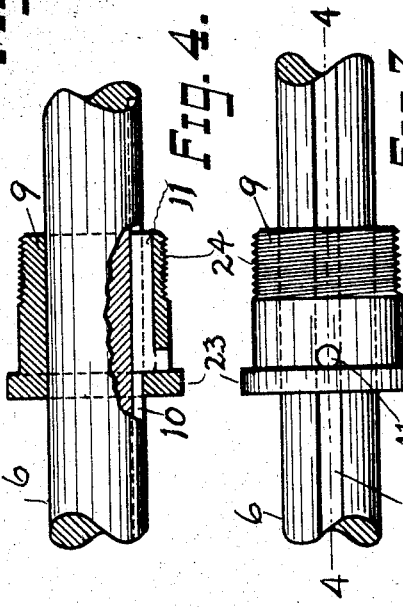
INVENTOR:
Fred K. Hendrickson
BY Oscar L. Owen
ATTORNEY.

Patented July 20, 1926.

1,593,073

UNITED STATES PATENT OFFICE.

FRED K. HENDRICKSON, OF WORCESTER, MASSACHUSETTS, ASSIGNOR TO WHITIN MACHINE WORKS, OF WHITINSVILLE, MASSACHUSETTS, A CORPORATION OF MASSACHUSETTS.

SHAFT BEARING.

Application filed February 24, 1926. Serial No. 90,303.

This invention relates to bearings for supporting a reciprocating shaft having a high rotative speed, particular reference being had to bearings used with stripping rolls of carding machines, and has for its object the construction of a bearing housing in which will be combined simplicity, durability and efficiency.

It consists in certain novel features of construction and arrangements of parts, which will be readily understood by reference to the description of the drawings and to the claim to be hereinafter given.

Of the drawings, Figure 1 represents a longitudinal section of a card stripper casing and shaft with my improved bearings. Figure 2 is an enlarged sectional elevation on line 2—2 of Figure 1 showing the bearing housing with its cap removed. Figure 3 is a side elevation of the sleeve and shaft showing the keyway in the latter. Figure 4 is a sectional plan on line 4—4 of Figure 3.

Referring to the drawings, in which like numerals indicate corresponding parts wherever occurring, 5 represents a circular shaped casing in which the stripper brush (not shown in the drawings) fixed to the shaft 6 revolves at a high speed. The casing is provided with head members 7 which are rigidly connected to stationary parts of the machine (not shown).

The shaft 6 projecting through apertures 8 in the heads 7 is provided with sleeves 9 in which the shaft is slidably mounted, by the coaction of the keyways 10 cut in the shaft and the splines 11 fixedly connected in the bores of their respective sleeves 9. Each sleeve is provided with a flange or shoulder 23 and a threaded portion 24 for a clamping nut 25 between which a well known type of anti-friction bearing 26 is rigidly mounted. The bearings are slidably mounted in circular shaped chambers 27 concentric with the shaft 6, formed in the outer ends of housings 12 bolted to the casing ends 7. The bearings are maintained in a rigid relation with their respected housings by pressure exerted between caps 13 bolted to the housings and seats or flanges 14 integral with the inner walls of the housings.

Rotary motion is imparted to the shaft 6 through belt connection from a rotative mechanism of the machine, with the pulley 15 fixed to one end of the shaft, the other end of the shaft being provided with a worm 16 actuating a worm gear 17 rotatable on a shaft or stud 18 fixed in the hanger 19 which is loosely mounted on the shaft 6 between the shoulder 20 on said shaft and collar 21 in a fixed relation to the shaft 6. A tie-link 22 is eccentrically connected at one end to the worm gear 17 while the other end is swingably mounted on a stationary part of the machine. With this construction the shaft 6 is slowly reciprocated while the shaft revolves.

My construction is advantageous for the reason that the shaft is maintained in perfect alignment and the bearings are easily removable whenever desired.

I claim:

In a mechanism of the character described, the combination of a rotatable shaft, means for imparting reciprocating motion thereto, a stationary housing through which the shaft passes, a circular shaped chamber concentric with said shaft located in the outer end of said housing, a sleeve in which the shaft is slidably mounted, a keyway in the shaft, a spline fixedly connected in the bore of the sleeve and coacting with said keyway, an anti-friction bearing rigidly mounted on the sleeve and a cap for maintaining the bearing in the chamber.

In testimony whereof, I have signed this specification.

FRED K. HENDRICKSON.